Jan. 21, 1958  G. P. NAPIERSKIE  2,820,379
PNEUMATIC SOIL PIPE CALKER
Filed Dec. 3, 1952  3 Sheets-Sheet 1

INVENTOR.
GLENN P. NAPIERSKIE
BY
*Knox & Knox*
AGENTS

Jan. 21, 1958 G. P. NAPIERSKIE 2,820,379
PNEUMATIC SOIL PIPE CALKER
Filed Dec. 3, 1952 3 Sheets-Sheet 2
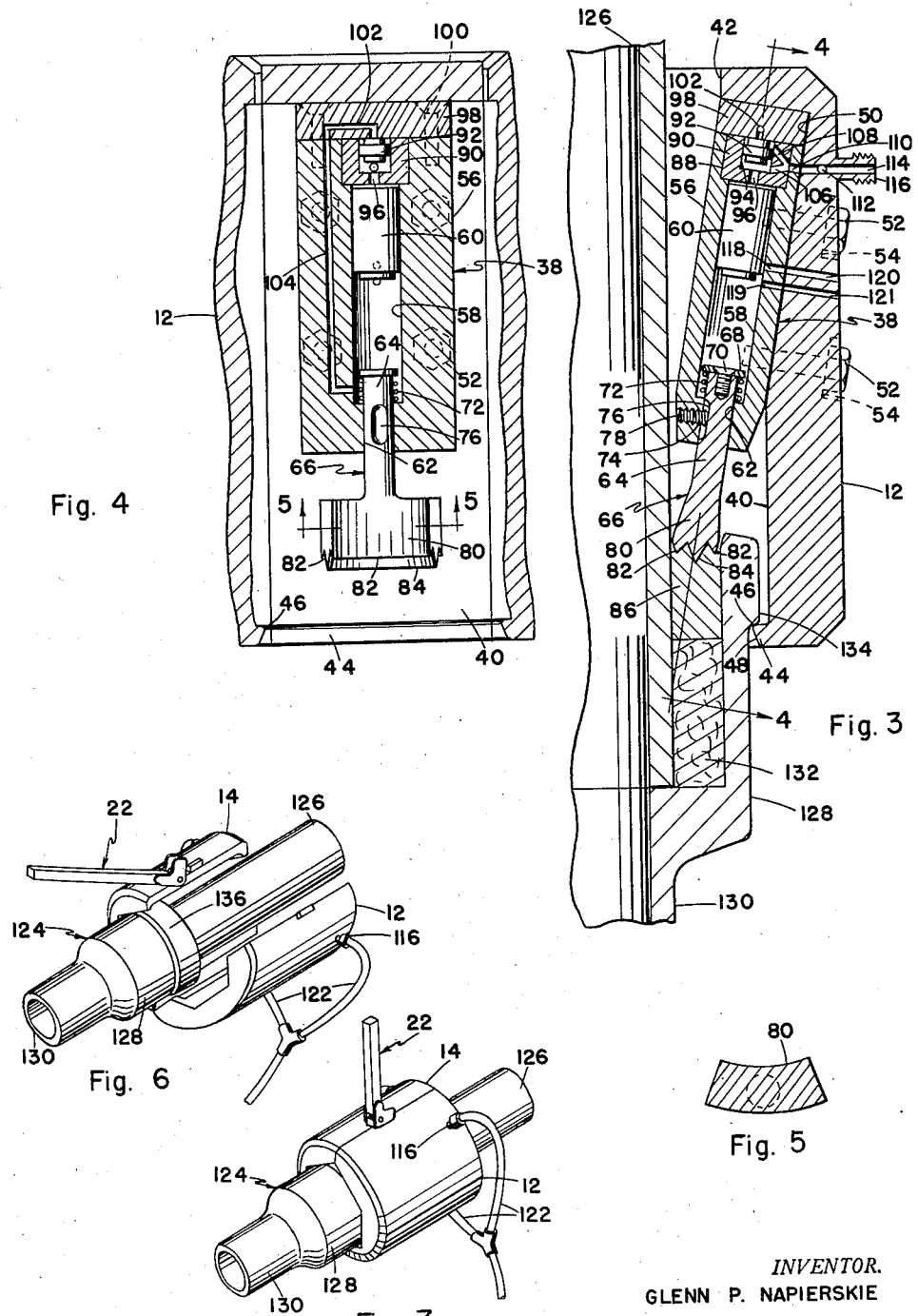
INVENTOR.
GLENN P. NAPIERSKIE
BY Knox & Knox
AGENTS Jan. 21, 1958 G. P. NAPIERSKIE 2,820,379
PNEUMATIC SOIL PIPE CALKER
Filed Dec. 3, 1952 3 Sheets-Sheet 3

INVENTOR.
GLENN P. NAPIERSKIE
BY
Knox & Knox
AGENTS

United States Patent Office 2,820,379
Patented Jan. 21, 1958

2,820,379

PNEUMATIC SOIL PIPE CALKER

Glenn P. Napierskie, Grossmont, Calif.

Application December 3, 1952, Serial No. 323,893

4 Claims. (Cl. 78—47)

The present invention relates generally to a calking tool and more particularly to a pneumatic calking tool for calking joints in soil pipes.

The joints of soil pipes are normally made by inserting the plain end of one pipe into the enlarged bell portion of the succeeding pipe. The space thus left between the outside of the plain end and the inside of the bell portion is then partially filled with a layer of oakum or the like, the remainder of the space being filled with lead. The lead must be calked around the edges to provide a tight seal in the joint and this is normally done by hand which entails lengthy and tedious work especially if the pipes are submerged in a trench.

The primary object of this invention is to provide a pneumatic calking tool which will calk the lead filling of a soil pipe joint in one operation.

Another object of this invention is to provide a pneumatic calking tool which may be quickly fitted around the pipes and secured in position while the calking operation is taking place.

Another object of this invention is to provide a pneumatic calking tool having a plurality of pneumatic calking hammers which are individually removable for servicing or replacement.

Another object is to provide a calking tool which is easily portable and suitable for use both in shops and as a tool carried by workmen from place to place during plumbing installation.

Another object of this invention, ancilliary to the preceding objects, is to teach the best known mode of implementing the principles of the invention in carrying the invention into actual practice.

Another object of this invention is to provide a calking tool which is inexpensive and practicable to manufacture.

Finally, it is an object to provide a pneumatic calking tool of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 3 is a vertical sectional view taken on the line 3—3 of Fig. 1.

Fig. 4 is a fragmentary sectional view taken on the line 4—4 of Fig. 3.

Fig. 5 is a sectional view taken on the line 5—5 of Fig. 4.

Fig. 6 is an isometric view of the tool being fitted around a pipe joint.

Fig. 7 is an isometric view of the tool fitted around the pipe joint and secured in position.

Figure 1:
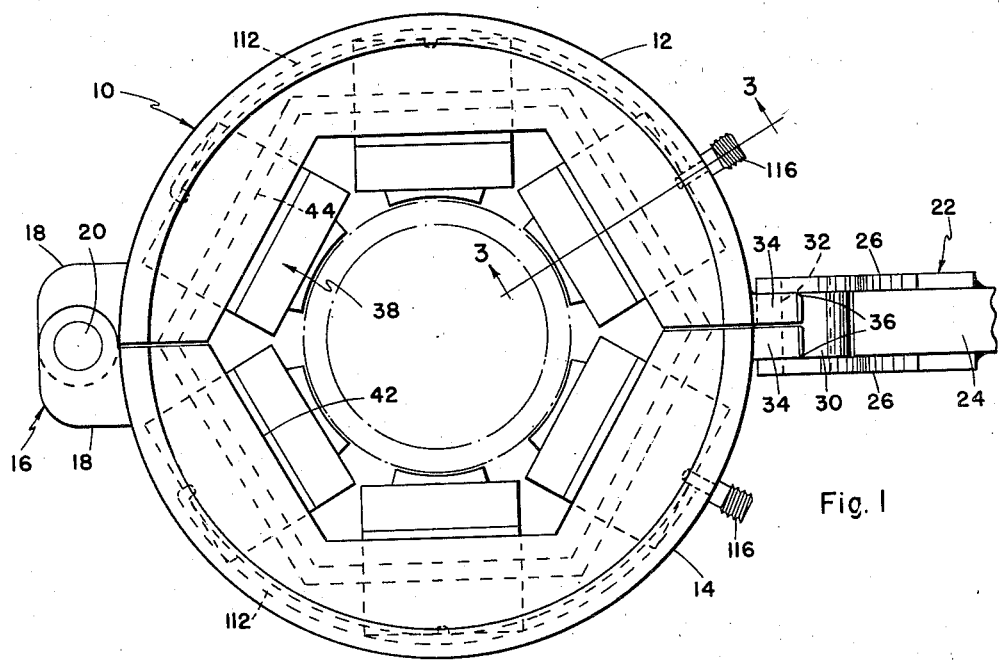
Fig. 1 is a plan view of the pneumatic calking tool.

Referring now to the drawing in detail, the device comprises a substantially cylindrical housing 10 consisting of two half housings 12 and 14 which are pivotally connected by means of a hinge 16. The hinge 16 includes a plurality of lugs 18 which are secured to the half housings 12 and 14, so that said lugs interlock. The lugs are connected by means of a hinge rod 20 passing through all of said lugs and secured by any suitable method such as peening or riveting.

The half housings 12 and 14 are retained together in the closed position by means of a locking handle 22 comprising a handle 24 having two side plates 26 secured to one end of said handle and extending longitudinally beyond the end of said handle, said side plates also having tongues 28 extending laterally on one side of the handle. The locking handle 22 is pivotally attached to a mounting block 30 which is integrally formed with or secured to the half housing 14 and extending beyond the edge of said half housing so that the locking handle will be located centrally over the division between the two half housings when in the closed position. The mounting block fits between the side plates 26, said locking handle being secured thereon by means of a hinge pin 32.

Figure 2:
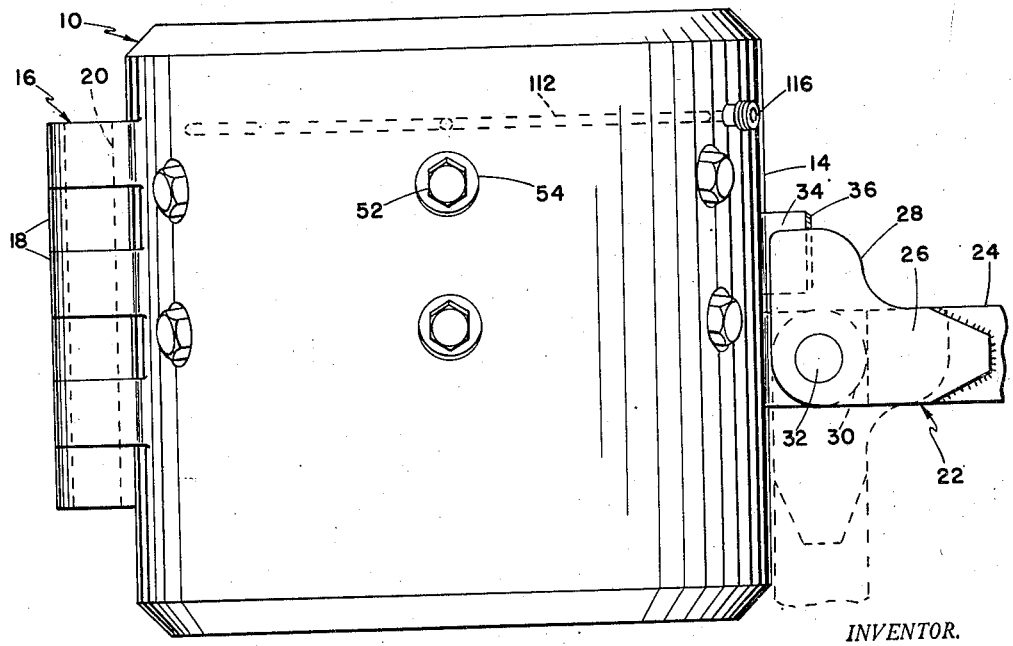
Fig. 2 is a side elevation view of the tool.

The half housings 12 and 14 are each provided with a lug 34, said lugs being positioned adjacent the free edges of said half housings so that the tongues 28 will engage both of said lugs when the locking handle 22 is extended radially in the locked position as illustrated in Fig. 2. The lugs 34 are chamfered as indicated at 36 and the tongues 28 are slightly resilient so that said tongues will slide easily over said lugs and clamp the two half housings 12 and 14 firmly together as the locking handle is pivoted outwardly.

The housing 10 contains a plurality of pneumatic hammer units 38, the number of which may be varied to suit the particular size of tool in use. For the purpose of this disclosure the tool is illustrated as having six such units equally spaced around the inside of the housing 10. The housing 10 is provided with a substantially hexagonal bore 40 having at one end an overhanging flange 42. The other end of the hexagonal bore 40 is provided with an inwardly extended lip 44 also defining a hexagonal opening, said lip having a rounded edge 46 and being outwardly tapered as indicated at 48. Each face of the hexagonal bore 40 has a recess 50, said recesses being equally angularly disposed and of such dimensions that one of the pneumatic hammer units 38 may be fitted firmly within each recess and retained by means of bolts 52 passing through the housing 10, which is counterbored as indicated at 54 to receive the heads of said bolts. Otherwise stated, the hammer units 38 are disposed in a regularly spaced row around the inner periphery or face of the housing.

The pneumatic hammer unit 38 comprises a substantially rectangular barrel 56, having a cylinder bore 58, in which is slidably mounted a piston 60. One end of the barrel 56 is closed, but is provided with a bore 62 in which is slidably fitted the shaft 64 of a calking bit 66. The calking bit 66 has an end cap 68 secured to the end of the shaft 64, within the barrel 56, by means of a screw 70 and is held in position by means of a spring 72 fitted around said shaft and retained by said end cap. The calking bit 66 is prevented from rotating within the bore 62 by a set screw 74 threadedly engaged in the barrel 56 and riding in a keyway 76 cut in the shaft 64. The set screw 74 is locked in position by means of a lock screw 78, the arrangement also serving to limit the movement of the calking bit 66.

The other end of the calking bit 66 consists of a spade 80 having two edge ribs 82 and an extended center rib 84, all of said ribs having relatively sharp edges. The thickness of the spade 80 should be approximately equal to the width of the lead to be calked and will vary with the size of the pipes being joined, as will the overall size of the complete tool. The spade 80 is arcuate in cross section as illustrated in Fig. 5, to conform to the diameters of the pipes being joined, so that the edge ribs 82 will align with the inner and outer edges of the lead 86 as illustrated in Fig. 3.

The other end of the barrel 56 has a counterbore 88 in which is fitted a valve block 90 having a valve 92 sliding in an internal bore 94. One end of the valve block 90 is closed but is provided with an air hole 96 leading to the cylinder bore 58, said valve block being retained in the counterbore 88 by means of a head block 98 which is secured to the barrel by means of screws 100. The head block 98 is provided with a transfer passage 102 leading from the open end of the valve block 90 and connecting with a further transfer passage 104 which extends through the barrel 56 and enters the cylinder bore 58 at the end adjacent the calking bit 66.

The valve block 90 has two air passages 106 and 108, the air passage 106 leading to the closed end of said valve block and the air passage 108 leading to the open end of said valve blocks. Both of the air passages 106 and 108 converge to a common air inlet 110 in the barrel 56 which is further connected to an air duct 112 in the housing 10. The half housings 12 and 14 each have such an air duct 112, which extends through the half housing to reach each pneumatic hammer unit, said air duct being sealed at both ends and fed intermediately by air inlets 114 including threaded nipples 116 on said half housings and used for connection of flexible air hoses 122, leading from a source of compressed air, not shown. The barrel 56 is further provided wtih two exhaust ports 118 and 119 which register with corresponding exhaust outlets 120 and 121 in the respective half housing 12 or 14. The operation of the pneumatic hammer unit will be well understood by those skilled in the art but will now be explained for the purposes of this disclosure.

With the piston 60 and the valve 92 in the positions shown in Fig. 3, compressed air is introduced through the air inlet 114 and flows into the valve block 90. The valve 92 is maintained in equilibrium by an equal air pressure on each side, covering the opening to the transfer passage 102 so that the air will be directed through the air hole 96 into the cylinder bore 58. The air pressure will now force the piston 60 down to strike the calking bit 66 and as the piston reaches the end of its stroke the exhaust port 118 will be uncovered allowing the compressed air to escape to the atmosphere. The sudden escape of air will temporarily lower the pressure within the cylinder bore 50 destroying the equilibrium of the valve 92 and causing said valve to be forced downwardly to cover the air hole 96. The compressed air will now be directed through the transfer passages 102 and 104 to enter the cylinder bore 58 below the piston 60 thus forcing said piston upwardly in said cylinder bore. As the piston 60 reaches the end of its stroke the exhaust port 119 will be uncovered allowing the air to escape to the atmosphere. The immediate drop in pressure will once more destroy the equilibrium of the valve 92 causing said valve to be forced upwardly to cover the transfer passage 102, thus returning the moving components to the starting position. The action described will continue intermittently as long as compressed air is supplied, the succession of blows of the piston 60 on the calking bit 66 supplying the necessary hammering force.

The pneumatic calking tool is used by first opening the half housings 12 and 14 so that the device may be placed around a pipe joint 124 as illustrated in Fig. 6. The half housings are then closed and locked together by means of the locking handle 22 as previously described.

A fragmentary sectional view of such a pipe joint is illustrated in Fig. 3 in which a pipe 126 is inserted into the bell portion 128 of another pipe 130. The space between the pipe 126 and the inside of the bell portion 128 is partially filled with oakum 132 or the like while the remainder of the space is filled with the lead 86. To obtain a perfect seal between the two pipes, the lead must be pressed or calked tightly into the joint. This operation is normally accomplished by hand tools and hammers and requires considerable time to perform, especially when the pipe joint is inside a trench where the confined space makes such hammering difficult. The tool described herein is designed to accomplish the calking operation quickly and automatically in the minimum of space, at the saving of considerable time and labor.

With further reference to Fig. 3 it will be seen that the lip 44 engages the rim 134 normally found on the bell portion 128, thus holding the housing 10 firmly in position while the calking bits 66 are arcuately profiled as previously explained to fit around the pipe 126 and align with the lead 86. The compressed air is now turned on causing the pneumatic hammer units 38 to operate and force the calking bits 66 into the lead 86. The center rib 84 will enter the lead first and force the lead outwardly against the pipe 126 and the bell portion 128, thus pressing said lead tightly into the pores of the pipes. The edge ribs 82 will now enter the edges of the lead and calk said lead tightly to complete the seal. Due to slight unevenness in the construction of the pipes the calking bits 66 do not cover the entire surface of the lead due to the difficulty of constructing the tool to conform to the tolerances of the pipes. In order to calk the lead completely the tool may be rotated around the pipe joint using the locking handle 22 as a lever, and at this point it should be noted that the calking bits 66 are lifted clear of the lead after each blow by means of the springs 72, thus allowing free rotation of the tool without said calking bits binding in the lead.

After the calking operation is completed the tool is removed by pivoting the locking handle 22 until the tongues 28 are clear of the lugs 34, thus allowing the half housings 12 and 14 to fall apart.

Figure 9:
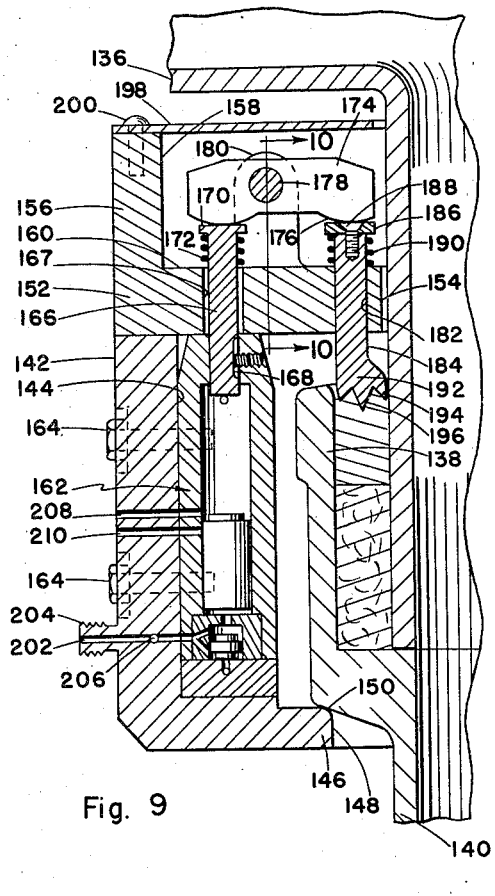
Fig. 9 is a vertical sectional view of a modified form of the device.
Figure 10:
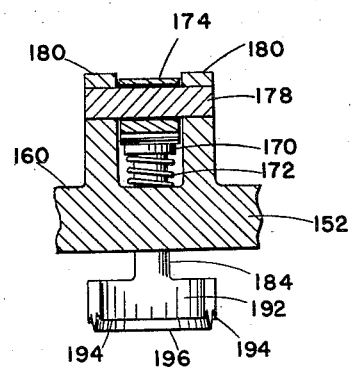
Fig. 10 is a sectional view taken on the line 10—10 of Fig. 9.
Figure 8:
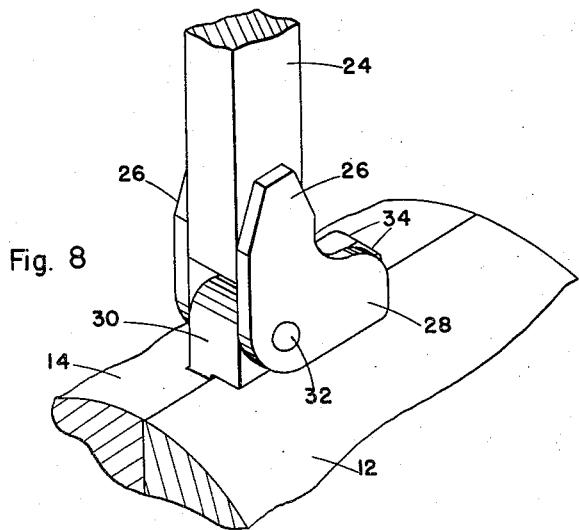
Fig. 8 is an enlarged isometric view of the locking handle mechanism.

A modified form of the device is illustrated in Fig. 9, this particular design being suited for use in restricted positions such as in the instance of T-fitting 136 or the like fitted into the bell portion 138 of a pipe 140 and the space between said bell portion and said fitting does not permit use of the device in the form previously described.

The modified device includes a housing 142 comprising two half housings and having hinges and a locking handle mechanism similar to that previously described. The housing 142 has a hexagonal internal bore 144 and is provided at one end with a lip 146 defining a hexagonal opening 148, the inner edge 150 of said lip being rounded. The other end of the housing 142 is fitted with an end plate 152 having a central opening 154 of sufficient size to fit around the T-fitting 136. The end plate 152 has a vertical flange 156 defining a recess 158, the bottom surface of which is also the upper surface 160 of said end plate.

The hexagonal interal bore 144 is fitted with six pneumatic hammer units 162, one of which is secured to each face of said internal bore by means of bolts 164. The pneumatic hammer units 162 are similar in all respects to the pneumatic hammer units 38 except that the calking bit 66 is replaced by a hammer lift 166 which extends upwardly through an opening 167 in the end plate 152. The hammer bit 166 has a keyway 168 and is retained in a manner similar to that described for the calking bit 66. The hammer bit 166 also has an end flange which serves to retain a spring 172 between said flange and the surface 160 for biasing said hammer bit upwardly against the rocker arm 174.

The rocker arm 174 is provided with two end lobes 176 and 177 each having a convex lower face. The rocker arm is pivotally mounted on a rocker shaft 178 between two support lugs 180 which are secured to the surface 160.

The end plate 152 is provided with six holes 182 in which are slidably fitted the calking bits 184, each of said calking bits having an end cap 186 secured by a screw 188. The calking bits 184 are positioned so that they fall directly beneath the end lobes 177 of the rocker arms 174 and are retained in contact therewith by means of springs 190.

The lower end of each calking bit 184 consists of a spade 192 having two edge ribs 194 and an extended center rib 196. The spade 192 is arcuate in cross-sections and performs the same functions as previously described for the spade 80.

The rocker mechanism is protected by means of a cover plate 198 secured to the flange 156 by means of screws 200, it being obvious that said cover plate and the end plate 152 must be divided to open with the two half housings comprising the housing 142.

Compressed air is supplied to the pneumatic hammer units 162 by means of an air inlet 202 emerging from the housing 142 through an air hose connection 204 similar to the air hose connection 116. The air inlet 202 connects internally with an air duct 206 which conveys the air to each pneumatic hammer unit as previously described. The housing 142 is also provided with exhaust outlets 208 and 210 aligning with the respective exhaust ports of the pneumatic hammer unit 162.

The operation of the modified form of the device is similar to that described except that the percussive force imparted to the hammer bit 166 is transferred through the rocker arm 174 to the calking bit 184, thus effectively reversing the direction of the force and permitting the construction of a more compact unit for use in confined positions.

It must be understood that the number of pneumatic hammer units used in one tool is not limited to the six described herein but is dependent on the size of the pipe to be joined, or the number of units may be determined by manufacturing considerations. The pneumatic calking tool will greatly reduce the time required to prepare a perfect seal in a pipe joint. This is particularly true where a large number of identical pipe assemblies are constructed for installation in similar buildings, which process entails a considerable amount of calking.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

1. In a pneumatic calking tool for calking a soil pipe bell and spigot joint having a bell portion, said tool comprising: a housing having a central opening and divided diametrically of said opening into two half housings, hinge means connecting said half housings, locking means for locking said half housings together in surrounding relationship with a soil pipe joint, said half housings having inwardly projecting flange-like lips for abutting engagement of the bell portion of a soil pipe joint to prohibit axial movement of the housing in one direction while allowing the housing to be shifted rotatively about its axis, a plurality of reciprocating pneumatic hammer units operatively mounted within said housing and including hammer elements having a power stroke directed substantially axially of the housing, means for supplying compressed air to said pneumatic hammer units, said housing having at one end a lip for frictional engagement of the bell of a soil pipe joint when the tool is placed thereon, said lip constituting means to prohibit movement of the housing in the direction opposite to the direction of said power stroke.

2. Apparatus according to claim 1 and wherein said lip is multi-sided to provide a multi-point contacting means so that the actual area of contact is minimized and the effect of small protuberances and irregularities in the pipe operated upon is minimized.

3. In a pneumatic calking tool for calking a soil pipe bell and spigot joint having a bell portion, said tool comprising; a housing having a central opening and divided diametrically of said opening into two half housings, hinge means connecting said half housings, locking means for locking said half housings together in surrounding relationship with a soil pipe joint, said half housings having inwardly projecting flange-like lips for abutting engagement of the bell portion of a soil pipe joint to prohibit axial movement of the housing in one direction while allowing the housing to be shifted rotatively about its axis, a plurality of reciprocating pneumatic hammer units operatively mounted on said housing on the inner face thereof and disposed in a regularly spaced row around said inner face, said hammer units being similar and including hammer elements having a stroke directed substantially axially of the housing with the power stroke of said elements being in the direction opposite to the first mentioned direction, and means for supplying compressed air to said pneumatic hammer units, said housing having a multi-sided bore with each side being substantially flat with a recess in each side of said multi-sided bore, said pneumatic hammer units being partially enclosed in said recesses whereby said hammer elements are disposed in slightly inclined relation to the axis of said housing.

4. In a pneumatic calking tool for calking a soil pipe bell and spigot joint having a bell portion, said tool comprising; a housing having a central opening and divided diametrically of said opening into two half housings, hinge means connecting said half housings, locking means for locking said half housing together in surrounding relationship with a soil pipe joint, said half housings having inwardly projecting flange-like lips for abutting engagement of the bell portion of a soil pipe joint to prohibit axial movement of the housing in one direction while allowing the housing to be shifted rotatively about its axis, said locking means including a handle having two side plates thereon, tongues projecting from said side plates, said tongues engaging adjacent lugs on said half housings and said handle being pivotally secured to a mounting block on one of said half housings at right angles to the axis thereof, said handle when in locked position comprising a lever whereby the housing can be oscillated about its axis during operation of the tool, a plurality of reciprocating pneumatic hammer units operatively mounted on said housing on the inner face thereof and disposed in a regularly spaced row around said inner face, said hammer units being similar and including hammer elements having a stroke directed substantially axially of the housing with the power stroke of said elements being in the direction opposite to the first mentioned direction, and means for supplying compressed air to said pneumatic hammer units, said compressed air supplying means including an air duct within each of said half housings, said pneumatic hammer units having air inlets and said air inlets communicating with said air ducts when said hammer units are in place, an air inlet to each of said air ducts, exterior air hose connections for said air inlets, and exhaust outlets in said housing communicating with said hammer units.

References Cited in the file of this patent

UNITED STATES PATENTS

| | | |
|---|---|---|
| 216,112 | Sickels | June 3, 1879 |
| 1,033,279 | Simpson | July 23, 1912 |
| 1,065,629 | Simpson | June 24, 1913 |
| 1,322,584 | Kraft | Nov. 25, 1919 |
| 2,182,663 | Eby et al. | Dec. 5, 1939 |
| 2,557,191 | King | June 19, 1951 |